United States Patent
Laredo et al.

(10) Patent No.: US 7,694,301 B1
(45) Date of Patent: Apr. 6, 2010

(54) METHOD AND SYSTEM FOR SUPPORTING INPUT/OUTPUT FOR A VIRTUAL MACHINE

(76) Inventors: Nathan Laredo, 4380 Albany Dr., Apt. 32, San Jose, CA (US) 95129; Linus Torvalds, 5774 Cannes Pl., San Jose, CA (US) 95138

( * ) Notice: Subject to any disclaimer, the term of this patent is extended or adjusted under 35 U.S.C. 154(b) by 1282 days.

(21) Appl. No.: 10/609,158

(22) Filed: Jun. 27, 2003

(51) Int. Cl.
  *G06F 9/455* (2006.01)
  *G06F 15/76* (2006.01)
  *G06F 9/45* (2006.01)

(52) U.S. Cl. .......................... 718/101; 712/24; 717/139

(58) Field of Classification Search ...................... 718/1; 712/24; 717/139
See application file for complete search history.

(56) References Cited

U.S. PATENT DOCUMENTS

| | | | | |
|---|---|---|---|---|
| 5,361,375 A | * | 11/1994 | Ogi | 718/1 |
| 6,349,377 B1 | * | 2/2002 | Lindwer | 712/22 |
| 6,397,242 B1 | * | 5/2002 | Devine et al. | 718/1 |
| 6,961,843 B2 | * | 11/2005 | O'Connor et al. | 712/208 |
| 7,089,539 B2 | * | 8/2006 | Dornan et al. | 717/139 |
| 7,260,820 B1 | * | 8/2007 | Waldspurger et al. | 718/1 |
| 2002/0184618 A1 | * | 12/2002 | Bala et al. | 717/148 |
| 2004/0010788 A1 | * | 1/2004 | Cota-Robles et al. | 718/1 |
| 2004/0215444 A1 | * | 10/2004 | Patel et al. | 704/2 |

OTHER PUBLICATIONS

Masera et al. "A quantitative approach to the design of an optimized hardware interpreter for Java byte-code", Proceedings of the Seventeenth IASTED International Conference. Applied Informatics. p. 51-4. ACTA Press, 1999.*

* cited by examiner

*Primary Examiner*—Meng-Ai An
*Assistant Examiner*—Kenneth Tang (57) ABSTRACT

A method for supporting input/output for a virtual machine. The method includes the step of executing virtual machine application instructions, wherein the application instructions are executed using micro architecture code of a processor architecture. An I/O access is received from the virtual machine application. Virtual memory protection is used to generate an exception, wherein the exception is caused by the I/O access. A single step mode is entered to perform the I/O access using a host operating system. State data for the virtual machine application is updated in accordance with the I/O access. Subsequently, execution of the virtual machine application is resumed.

27 Claims, 6 Drawing Sheets

METHOD AND SYSTEM FOR SUPPORTING INPUT/OUTPUT FOR A VIRTUAL MACHINE

TECHNICAL FIELD

The present invention relates generally to digital computer systems. More specifically, the present invention pertains to efficiently implementing support for a virtual machine and applications executing within the virtual machine.

BACKGROUND ART

Many types of digital computer systems are used to implement virtual machines and support for applications that execute within virtual machines. Generally, the term "virtual machine" refers to a computer system image or process that supports multiple computer system images/processes. Each image can contain an operating system and its associated applications, or alternatively, each image may have the same operating system or different respective operating systems. Some prior art computer systems are specifically built with hardware circuits that support virtual machine capability, however, most prior art computer systems are configured to support virtual machine entirely through software. These prior art solutions are limited in their performance and usefulness due to fact that software support requires very slow software based emulation while the hardware support only implements primitive early generation processor platforms. Thus what is required is a solution that can efficiently implement support for full capability virtual machines and applications executing within virtual machines.

DISCLOSURE OF THE INVENTION

Embodiments of the present invention provide a method and system for supporting input/output for a virtual machine.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE EMBODIMENTS

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention provide a method and system for supporting input/output for a virtual machine. Embodiments of the present invention support the execution of virtual machine application instructions, wherein the application instructions are executed using micro architecture code of a processor architecture. Upon receiving an I/O access from the virtual machine application, the I/O access is performed by using a host operating system. The state data for the virtual machine is then updated in accordance with the I/O access. Virtual machine execution is then resumed. Embodiments of the present invention and their benefits are further described below.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals on a computer readable storage memory or a computer readable storage media capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing" or "accessing" or "recognizing" or "retrieving" or "translating" or the like, refer to the action and processes of a computer system (e.g., system 600 of FIG. 6), or similar electronic computing device, that manipulates and transforms data represented as physical (electronic) quantities within the computer system's registers and memories into other data similarly represented as physical quantities within the computer system memories or registers or other such information storage, transmission or display devices.

EMBODIMENTS OF THE PRESENT INVENTION

Figure 1:
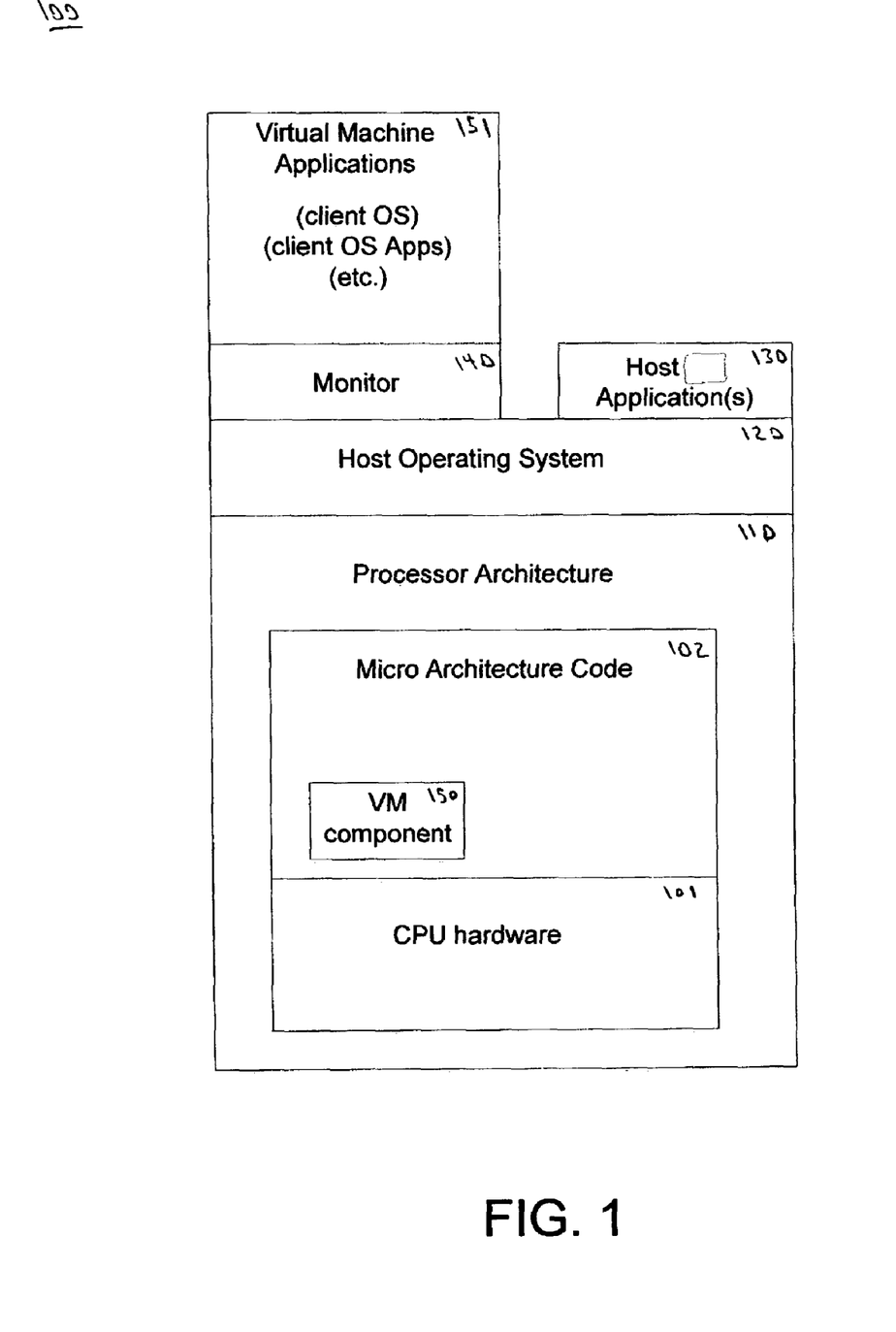
FIG. 1 shows a diagram of a computer system configured for supporting input/output for virtual machine in accordance with one embodiment of the present invention.

FIG. 1 shows a diagram of a computer system 100 configured for supporting input/output for a virtual machine in accordance with one embodiment of the present invention. As depicted in FIG. 1, system 100 shows a processor architecture 110, including a CPU hardware unit 101 and micro architecture code 102. A host operating system 120 is configured to execute on the platform provided by the processor architecture 110. The host operating system 120 supports the execution of one or more applications 130 and a monitor 140. The monitor 140 implements a virtual machine environment that provides support for the execution of one or more virtual machine applications 151.

The system 100 embodiment implements a method and system for supporting input/output for the virtual machine applications 151. Depending upon the particular requirements of a given application, the virtual machine applications 151 can include, for example, a client operating system, client operating system applications, and the like. In the present embodiment, the monitor 140 operates in conjunction with a virtual machine component 150. The virtual machine component 150 provides the mechanism by which the micro architecture code 102 and the CPU hardware 101 execute the software code of the virtual machine applications 151. The monitor 140 executes on top of the host operating system 120. The host operating system 120 provides execution resources (e.g., memory, device driver support, I/O, and the like) for both the applications 130 and the monitor 140. In this manner, the data and resources of the monitor 140 are generally handled in the same manner as other applications 130 which are executing on the host operating system 120. The system 100 embodiment of the present invention thus provides a "soft CPU" the virtual machine applications 151.

The virtual machine applications 151 run within the address space provided by the monitor 140. The virtual machine applications 151 can further define other processes that run within the address space provided by the monitor 140. For example, one of the virtual machine applications 151 can be a client operating system (e.g., client OS), wherein the client operating system allocates and manages processes/address space for other virtual machine applications (e.g., client OS apps). In this manner, the monitor 140 can support multiple client operating systems that subsequently support their own respective client operating system applications. Similarly, multiple monitors, like the monitor 140, can be implemented by the host operating system 120, with each monitor being provided with its own address space/process.

In the system 100 embodiment, the applications 130 and the monitor 140 typically execute within their own respective processes, as provided by the host operating system 120. Memory protection and processor cycle allocation is handled by the host operating system 120. Virtual memory management, interrupt allocation, and the like for the applications 130 and the monitor 140 are also handled by the host operating system 120. The host operating system 120 executes on top of the processor architecture 110.

The system 100 embodiment of the present invention provides a unique processor architecture 110 to provide much faster virtual machine performance in comparison to the prior art. The system 100 embodiment provides the performance benefits, in part, by executing virtual machine application instructions using micro architecture code 102 of the processor architecture 110. The micro architecture code 102 in conjunction with the CPU hardware 101 provides an environment specifically configured to implement software code emulation and translation. In comparison, whereas some prior art computer systems include specially built hardware circuits that support virtual machine capability, and whereas other prior art computer systems support virtual machine capabilities entirely through software, the system 100 embodiment of the present invention utilizes specific attributes of the processor architecture 110 to for faster virtual machine performance.

The system 100 embodiment provides a fully functional virtual machine having all of the attributes of a conventional real machine. For example, the virtual machine provided by the system 100 embodiment has full support for interrupts, 32-bit memory addressing, virtual memory management, protected memory, and the like, in comparison to the limited capabilities provided by prior art hardware based virtual machine support (e.g., 8086 virtual mode, etc.).

Figure 5:
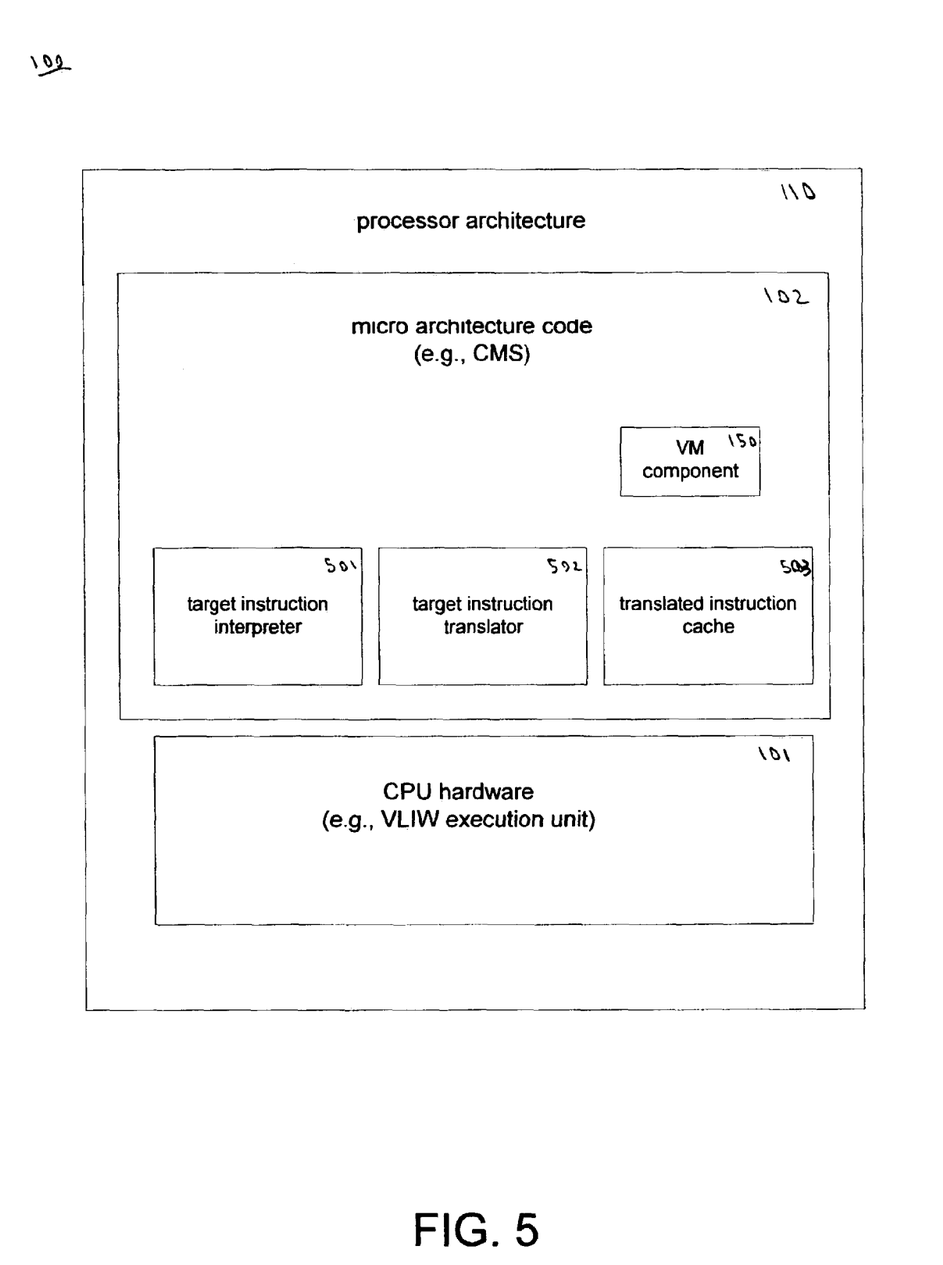
FIG. 5 shows a diagram showing components of the micro architecture code 102 of the processor architecture 110 in accordance with one embodiment of the present invention.

In one embodiment, the processor architecture 110 is specifically configured to implement a translation and emulation process. For example, depending upon the specific requirements of a particular implementation, non-native target applications (e.g., x86 applications) are emulated and translated using native micro architecture code 102 (e.g., VLIW code). The CPU hardware 10 executing the micro architecture code 102 can be a VLIW (very long instruction word) CPU hardware unit. In such an implementation, the VLIW instructions would be configured to efficiently feed multiple pipeline front ends of the CPU hardware 101 to achieve maximum concurrency and parallelism. In such an embodiment, the micro architecture code 102 can be used to implement, for example, specialized "code morphing software" (CMS) to support the efficient execution of the non-native target instructions on the CPU hardware 101. A basic diagram of such a processor architecture is shown in FIG. 5 below. Additional descriptions of processor architectures implementing translation can be found in commonly assigned U.S. Pat. No. 5,958,061, HOST MICROPROCESSOR WITH APPARATUS FOR TEMPORARILY HOLDING TARGET PROCESSOR STATE, which is incorporated herein in its entirety.

Figure 2:
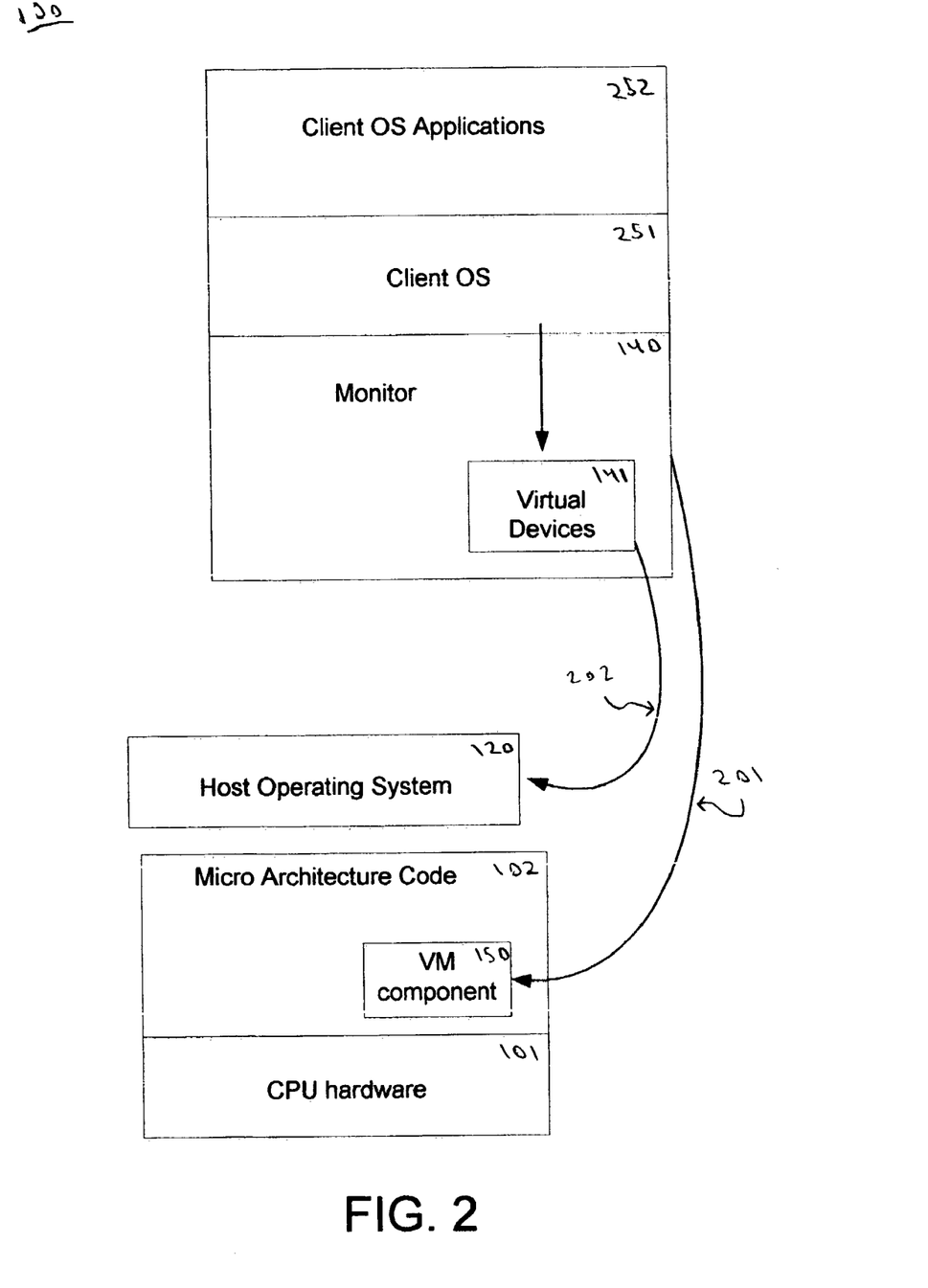
FIG. 2 shows a diagram of an input output process as implemented by the system in accordance with one embodiment of the present invention.

FIG. 2 shows a diagram of an input output process as implemented by the system 100 in accordance with one embodiment of the present invention. Specifically, FIG. 2 shows a system 100 embodiment wherein a client operating system 251 supports one or more client applications 252 and performs an input output access. Additionally, FIG. 2 shows virtual devices 141 that are maintained by the monitor 140 and that are used to implement the input output process.

The monitor 140, as described above, executes as a process on top of the host operating system 120. The monitor provides the communications mechanism between the virtual machine component 150 and the virtual devices 141 maintained within the monitor 140.

The virtual machine component 150 provides the mechanism by which the system 100 enters the virtual machine context vs. the real machine context. The virtual machine component 150 provides an instruction, which when invoked, allows the software code of the client operating system 251 and the client OS applications 252 to execute directly on the processor architecture 110. For example, when virtual machine mode is invoked, the virtual machine component 150 can enter the virtual machine context and accept a CPU saved state map to treat the process virtual address space as the new virtual CPU's physical memory space. The virtual machine component 150 allows the processor architecture 110 to execute (e.g., the software code of the client operating system 251 or the client operating system applications 252) until a real world event (e.g., hardware interrupt) or an unhandled instruction (e.g., an input output request from the client OS 251) occurs.

The virtual devices 141 provide software based device models for the real devices coupled to the computer system 100. The virtual devices 141 provide the mechanism by which the client operating system/applications 251-252 obtain access to real input output devices from the host operating system 120, as represented by the arrow 202.

In this manner, the monitor 140, the virtual devices 141, and the virtual machine component 150 provide a "soft motherboard" for routing signals between the real devices of the real motherboard (e.g., keyboard, mouse, hard drive, expansion buses, etc.) and the virtual devices 141 of the virtual machine.

Referring still to FIG. 2, generally, as the client operating system 251 and the client applications 252 execute, they update state data (e.g., files, data structures, etc.) for their process. However certain accesses involve I/O requests to disk drives, keyboards, network cards, peripherals, and the like. These accesses require reading and writing to ports, or memory addresses, which are maintained by the host operating system 120.

In the present embodiment, when an I/O request to a virtual device 141 is detected, the processor architecture 100 enters a special single step mode implemented through the virtual machine component 150. A request to an I/O memory address causes an exception and entry into the special single step mode as represented by the arrow 201. Once the single step mode is entered, the monitor 140 is invoked to determine the exact nature of the access. This process is diagramed in FIG. 3 and described in the flowchart of FIG. 4 below.

Figure 3:
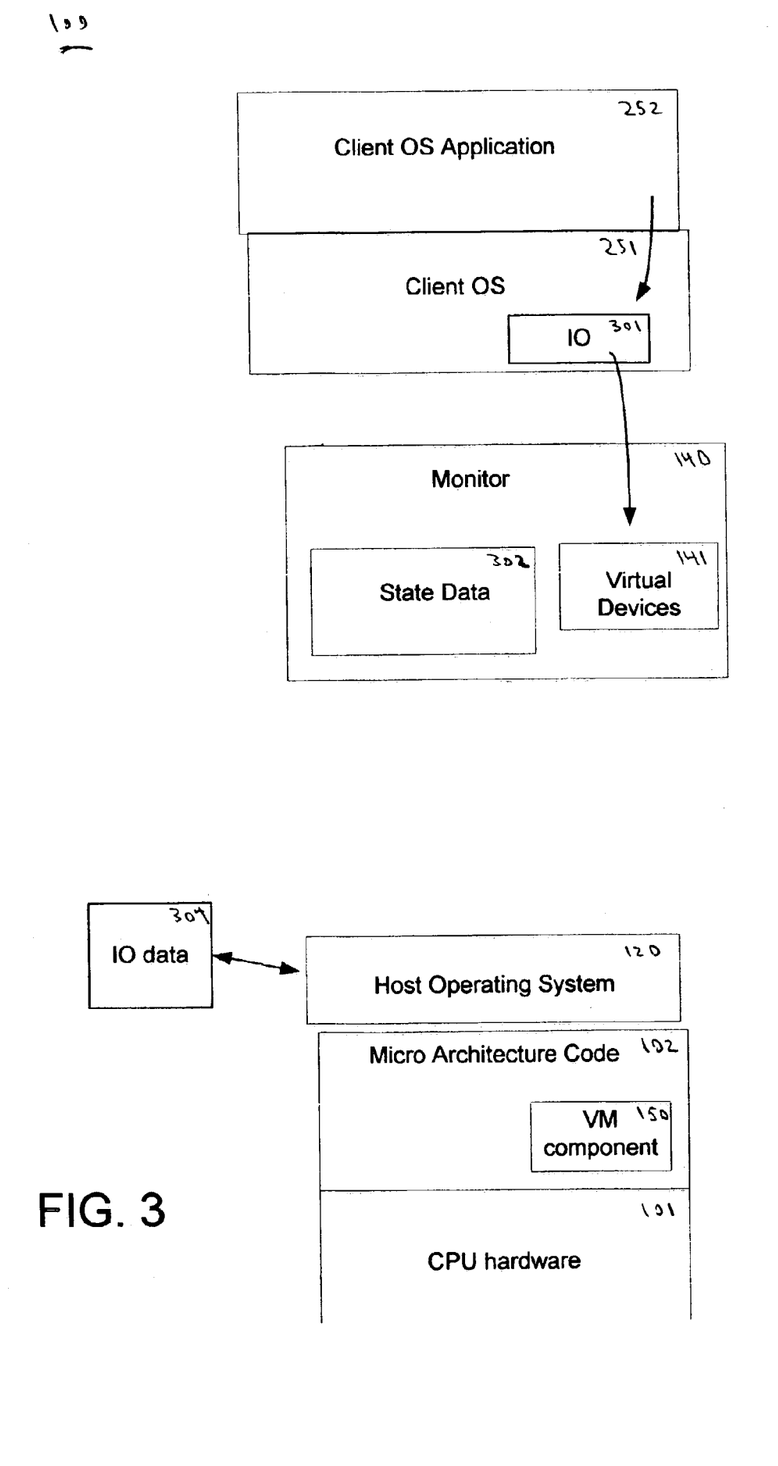
FIG. 3 shows a diagram of an I/O request and support for the I/O request as performed by the system in accordance with one embodiment of the present invention.
Figure 4:
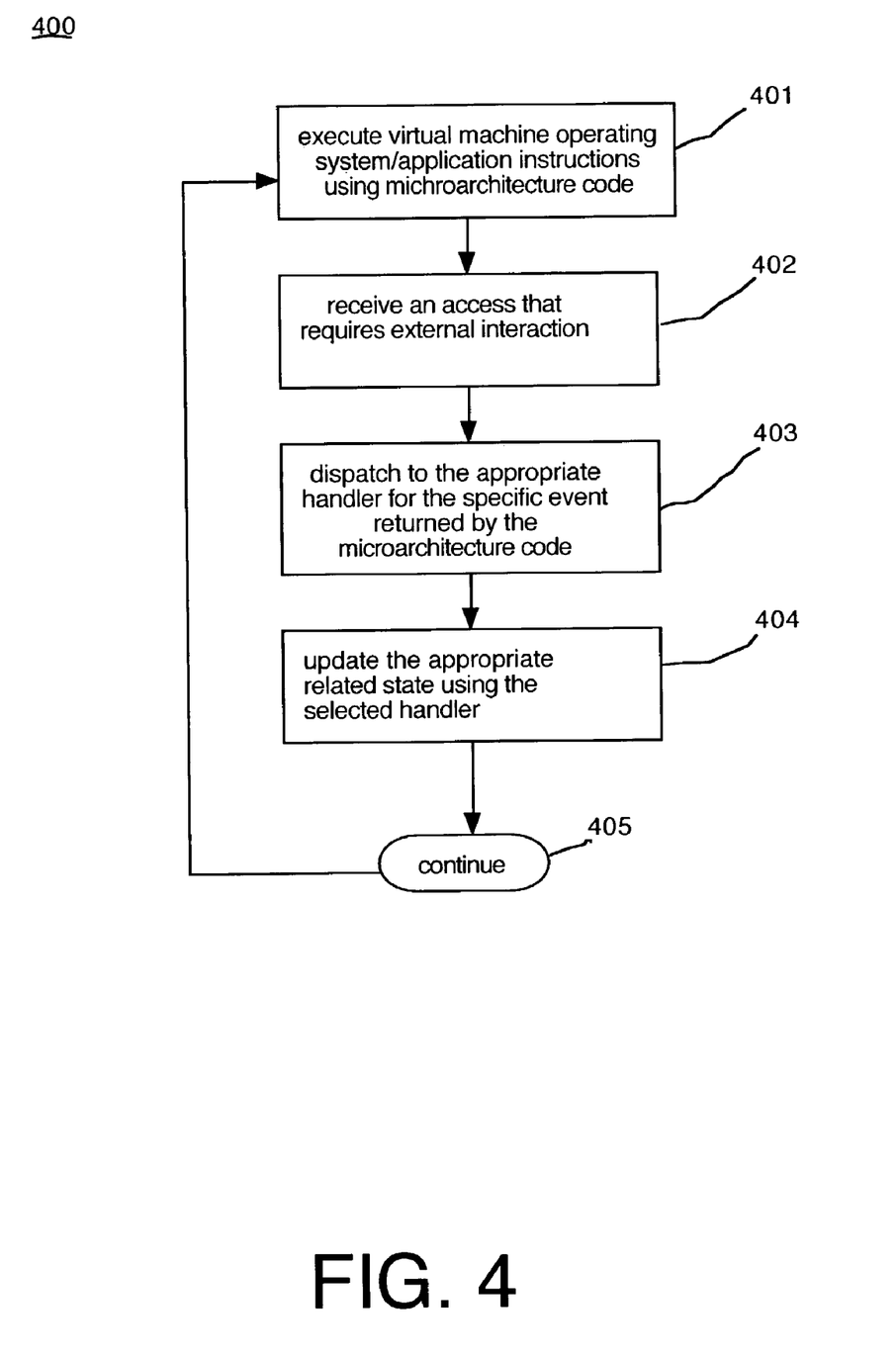
FIG. 4 shows a flowchart of the I/O access as implemented by the system diagram shown in FIG. 3.

Referring now to FIG. 3 and FIG. 4, FIG. 3 shows a diagram of an example of an I/O request and support for the I/O request as performed by the system 100 in accordance with one embodiment of the present invention. FIG. 4 shows a flowchart of an example of an I/O access as implemented by the system 100 diagram shown in FIG. 3. The process 400 shown in FIG. 4 is below described with reference to the diagram of FIG. 3.

In step 401 of FIG. 4, process 400 begins with the client operating system 251 and one or more client operating system application(s) 252 executing using the system 100 processor architecture, specifically, the micro architecture code 102 and the CPU hardware 101.

In step 402, the processor architecture (e.g., the micro architecture code 102 and CPU hardware 101) receives an access or an event that requires interaction with the outside (e.g., outside the process). The event can occur due to the client operating system application 252 attempting a read or a write (e.g., an IO access), or because of the occurrence of an event to which a notification has been previously solicited. Such events occur due to the client operating system application 252 accessing a specific address that triggers the event. Examples include the client operating system application 252 issuing a CPU ID instruction, reading the time stamp counter, reading or writing to model specific registers, and the like.

In step 403, the appropriate handler is dispatched to handle the specific event that is returned by the micro architecture code 102. In step 404, the dispatched handler handles the event as required and updates the related state (e.g., state data 302). Process 400 subsequently continues as shown by step 405, back to step 401, where the virtual machine operating system/application instructions are continually executed.

In this manner, process 400 spends a majority of its execution time in step 401, continually executing virtual machine code. When process 400 needs to drop out of step 401 into step 402, the steps 402-404 are implemented without requiring the processor architecture to actually examine the x86 code of the virtual machine operating system/application instructions. This is possible due to the attributes of the micro architecture code 102 as shown below in FIG. 5.

FIG. 5 shows a diagram showing components of the micro architecture code 102 of the processor architecture 110 in accordance with one embodiment of the present invention. As depicted FIG. 5, in the present embodiment, the micro architecture code 102 includes the virtual machine component 150, a target instruction interpreter 501, a target instruction translator 502, and a translated instruction cache 503. Embodiments of the present invention take advantage of the fact that the target instruction interpreter 501 and the target instruction translator 502 are particularly well suited for supporting a virtual machine implementation. In this embodiment, the CPU hardware unit 101 natively executes VLIW instructions, or host instructions. The instructions comprising the applications and the operating system (e.g., applications 130, the host operating system 120, and the like) are target instructions, in this embodiment, x86 target instructions. The translator 502 translates X86 target instructions into the host instructions. The translated instructions can be stored by the translated instruction cache 503 for subsequent execution. The target instructions can also be interpreted by the target instruction interpreter 501. In each case, target instructions are broken down into one or more host instructions that are specifically configured to execute very rapidly on the CPU hardware 101. Depending upon the specifics of a particular implementation, the components of the processor architecture 110 can be integrated in a single die or based on discrete chips.

Computer System Platform

Figure 6:
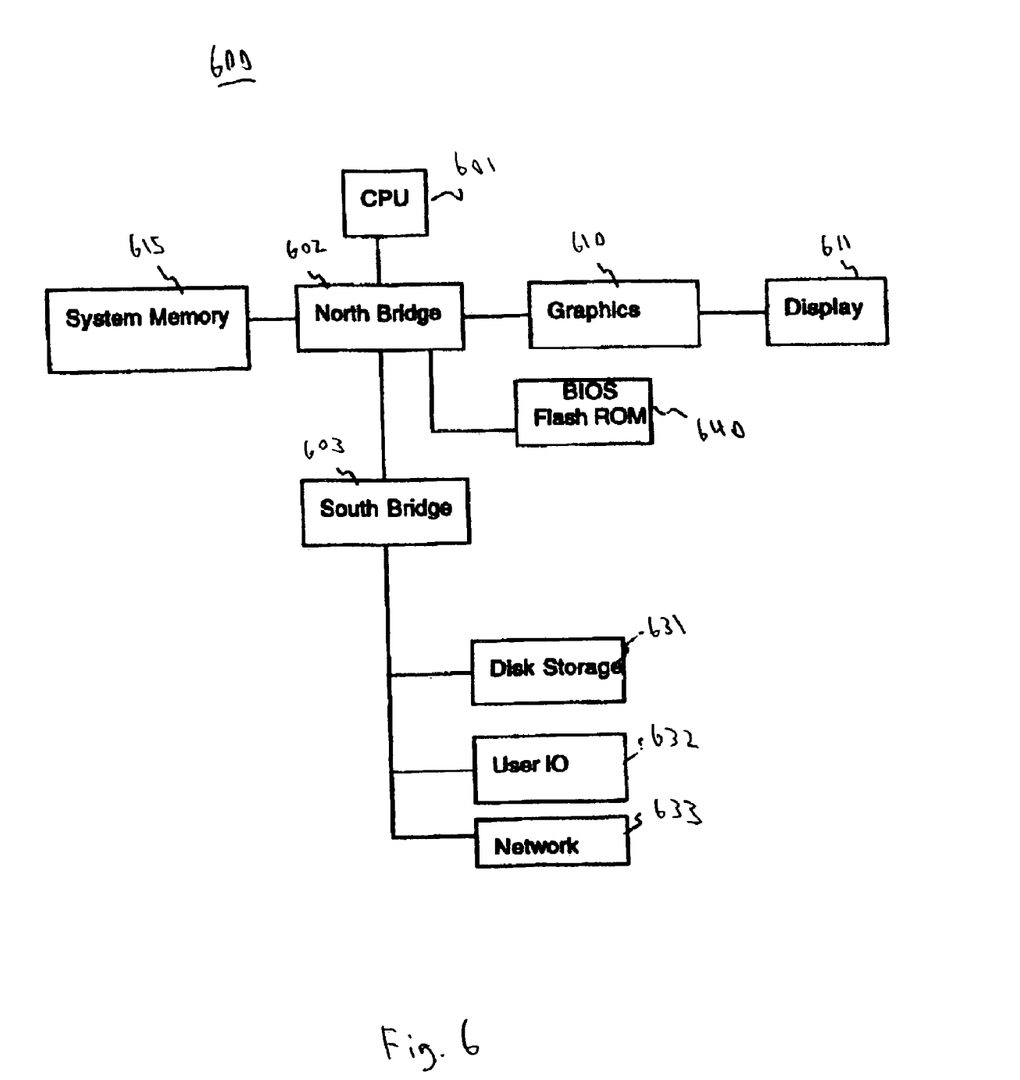
FIG. 6 shows a computer system platform in accordance with one embodiment of the present invention.

With reference now to FIG. 6, a computer system 600 in accordance with one embodiment of the present invention is shown. Computer system 600 shows the general components of a computer system in accordance with one embodiment of the present invention that provides the execution platform for implementing certain software-based functionality of the present invention. As described above, certain processes and steps of the present invention are realized, in one embodiment, as a series of instructions (e.g., software program) that reside within computer readable memory units of a computer system (e.g., system 600) and are executed by the CPU 601 of system 600. When executed, the instructions cause the system 600 to implement the functionality of the present invention as described above.

In general, system 600 comprises at least one CPU 601 coupled to a North bridge 602 and a South bridge 603. The North bridge 602 provides access to system memory 615 and a graphics unit 610 that drives a display 611. The South bridge 603 provides access to a plurality of coupled peripheral devices 631-633 as shown. Computer system 600 also shows a BIOS ROM 640 that stores BIOS initialization software.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method comprising:
   executing virtual machine application instructions of a virtual machine application by using micro architecture code of a processor architecture;

receiving an I/O access from the virtual machine application at a monitor supporting the virtual machine application;

in response to receiving the I/O access, generating an exception;

performing the I/O access by using a host operating system configured to support the monitor;

updating state data for the virtual machine application at the monitor in accordance with the I/O access, the updating performed by a virtual machine component of the micro architecture code;

resuming execution of the virtual machine application from the exception; and wherein the micro architecture code comprises an instruction interpreter that functions with an instruction translator to execute the virtual machine application instructions, wherein the virtual machine application instructions comprise target instructions and the micro architecture code comprises host instructions.

2. The method of claim 1, wherein the micro architecture code comprises an instruction interpreter that functions with an instruction translator to translate target instructions into host very long instruction word (VLIW) instructions to execute the virtual machine application instructions.

3. The method of claim 1, wherein the micro architecture code comprises an instruction translator to execute the virtual machine application instructions.

4. The method of claim 1, further comprising executing the monitor to implement the I/O access from the virtual machine application, wherein the monitor is configured to handle the exception caused by the I/O access.

5. The method of claim 4, further comprising entering a single step mode, wherein the single step mode causes the monitor to single step through the virtual machine application instructions to handle the exception.

6. The method of claim 4, further comprising using the monitor to maintain at least one virtual device to implement the I/O access from the virtual machine application.

7. The method of claim 6, further comprising:

using the host operating system to access a real device in response to an access to the at least one virtual device; and updating the state data for the virtual machine application in accordance with I/O data retrieved from the real device.

8. The method of claim 1, wherein the target instructions comprise x86 instructions, and the host instructions comprise VLIW instructions.

9. The method of claim 1, wherein the virtual machine comprises an x86 compatible virtual machine.

10. A system comprising:

a processor architecture including micro architecture code that executes natively on a CPU hardware unit of the processor architecture; and a memory coupled to the processor architecture, the memory configured to store virtual machine application instructions of a virtual machine application, wherein the virtual machine application instructions are for execution using the micro architecture code to cause the system to implement a method comprising:

receiving an I/O access from the virtual machine application at a monitor supporting the virtual machine application;

in response to receiving the I/O access, generating an exception;

performing the I/O access by using a host operating system configured to execute on the processor architecture and to support the monitor;

updating state data for the virtual machine application at the monitor in accordance with the I/O access, the updating performed by a virtual machine component of the micro architecture code;

resuming execution of the virtual machine application from the exception; and wherein the micro architecture code comprises an instruction interpreter that functions with an instruction translator to execute the virtual machine application instructions, wherein the virtual machine application instructions comprise target instructions and the micro architecture code comprises host instructions.

11. The system of claim 10, wherein the micro architecture code comprises an instruction interpreter configured to function with an instruction translator to translate target instructions into host VLIW instructions to execute the virtual machine application instructions.

12. The system of claim 10, wherein the micro architecture code comprises an instruction translator to execute the virtual machine application instructions.

13. The system of claim 10, wherein the method further comprises executing the monitor to implement the I/O access from the virtual machine application, wherein the monitor is configured to handle the exception caused by the I/O access.

14. The system of claim 13, wherein the method further comprises entering a single step mode which causes the monitor to single step through the virtual machine application instructions to handle the exception.

15. The system of claim 13, wherein the method further comprises using the monitor to maintain at least one virtual device to implement the I/O access from the virtual machine application.

16. The system of claim 15, wherein the method further comprises:

using the host operating system to access a real device in response to an access to the virtual device; and updating the state data for the virtual machine application in accordance with I/O data retrieved from the real device.

17. The system of claim 10, wherein the target instructions comprise x86 instructions, and the host instructions comprise VLIW instructions.

18. The system of claim 10, wherein the virtual machine comprises an x86 compatible virtual machine.

19. A computer readable medium having stored thereon, computer executable instructions that, if executed by a processor cause the processor to perform a method comprising:

executing virtual machine application instructions of a virtual machine application by using micro architecture code of a processor architecture;

receiving an I/O access from the virtual machine application at a monitor supporting the virtual machine application;

upon receiving the I/O access, generating an exception;

performing the I/O access by using a host operating system that executes on the processor architecture and that supports the monitor;

updating state data for the virtual machine application at the monitor in accordance with the I/O access, the updating performed by a virtual machine component of the micro architecture code;

resuming execution of the virtual machine application from the exception; and wherein the micro architecture code comprises an instruction interpreter that functions with an instruction translator to execute the virtual machine application instructions, wherein the virtual machine application instructions comprise target instructions and the micro architecture code comprises host instructions.

20. The computer readable storage media of claim 19, wherein the micro architecture code comprises an instruction interpreter configured to function with an instruction translator to translate target instructions into host VLIW instructions to execute the virtual machine application instructions.

21. The computer readable storage media of claim 19, wherein the micro architecture code comprises an instruction translator to execute the virtual machine application instructions.

22. The computer readable storage media of claim 19, wherein the method further comprises executing the monitor to implement the I/O access from the virtual machine application, and wherein the monitor is configured to handle the exception caused by the I/O access.

23. The computer readable storage media of claim 22, wherein the method further comprises entering a single step mode which causes the monitor to single step through the virtual machine application instructions to handle the exception.

24. The computer readable storage media of claim 22, wherein the method further comprises using the monitor to maintain at least one virtual device to implement the I/O access from the virtual machine application.

25. The computer readable storage media of claim 24, wherein the method further comprises:
using the host operating system to access a real device in response to an access to the virtual device; and
updating the state data for the virtual machine application in accordance with I/O data retrieved from the real device.

26. The computer readable storage media of claim 19, wherein the target instructions comprise x86 instructions, and the host instructions comprise VLIW instructions.

27. The computer readable storage media of claim 19, wherein the virtual machine comprises an x86 compatible virtual machine.

* * * * *